United States Patent
Koch

Patent Number: 5,152,308
Date of Patent: Oct. 6, 1992

[54] METHOD OF OPERATING A MOTOR-CONTROLLED VALVE

[75] Inventor: Werner Koch, Berg, Fed. Rep. of Germany

[73] Assignee: Knebel & Rottger GmbH & Co., Iserlohn, Fed. Rep. of Germany

[21] Appl. No.: 769,109

[22] Filed: Sep. 30, 1991

[30] Foreign Application Priority Data

Mar. 12, 1991 [DE] Fed. Rep. of Germany ....... 4107860

[51] Int. Cl.$^5$ .............................................. F16K 31/04
[52] U.S. Cl. ..................................... 137/1; 137/487.5; 251/129.12
[58] Field of Search ................. 137/1, 487.5; 251/129.12

[56] References Cited

FOREIGN PATENT DOCUMENTS 3518645 10/1987 Fed. Rep. of Germany .
4104318.9 2/1991 Fed. Rep. of Germany .

*Primary Examiner*—Gerald A. Michalsky
*Attorney, Agent, or Firm*—Herbert Dubno; Andrew Wilford

[57] ABSTRACT

The closed position of a valve having a valve member that can be rotated by an electrical motor that in turn is connected to a potentiometer furnishing an output corresponding to valve position is determined by first energizing the motor so as to close the valve and monitoring the current consumption of the motor. The instantaneous current consumption of the motor is continuously or periodically compared with a set point corresponding to motor current consumption of the motor when stalled and the potentiometer output is recorded in a nonvolatile memory generally when the instantaneous motor current consumption exceeds the output so as to establish the corresponding position as the motor closed position. Then the motor is de-energized and from then on the recorded position is used as the full-closed valve position.

7 Claims, 1 Drawing Sheet

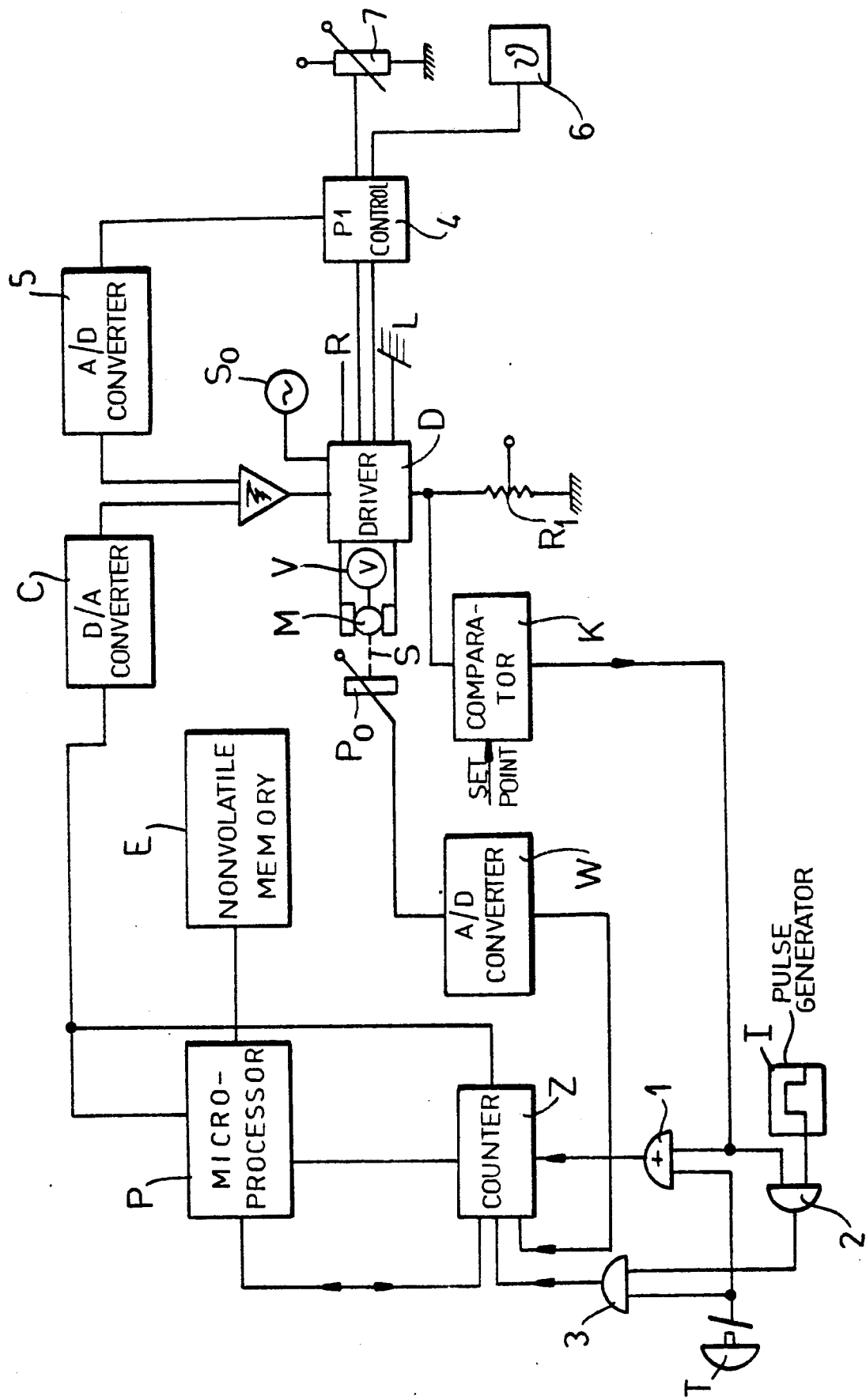

METHOD OF OPERATING A MOTOR-CONTROLLED VALVE

FIELD OF THE INVENTION

The present invention relates to a motor-controlled valve. More particularly this invention concerns a method of operating such a valve mainly to determine how much it is open.

BACKGROUND OF THE INVENTION

A standard flow-control valve can be controlled by a motor unit that is connected to the shaft of the valve and that incorporates a potentiometer whose resistance is an analog output corresponding to valve position. This analog output can be electronically evaluated to determine if the valve is open or closed, and just what intermediate position it may be in.

In German patent documents 3,518,645 and 4,104,318 these systems operate by a method whereby on initial installation the position-reading mechanism is zeroed, that is set to read the closed position of the valve, by the installer. This is a fairly complex calibrating system that must be carried out by an experienced worker. Since the angular movement of a valve from full closed to fully open, or from full cold to full hot depending on the type of valve, is constant for a given type of valve, the exact location of the fully closed position is extremely critical.

In addition a problem with known valves is that, with time, the valve wears somewhat and the fully closed position can actually move slightly, so that when the valve controller detects that the valve is closed, for instance, it is still open a little. Similarly in some of the systems the valve can get stiffer so that it cannot move into the fully closed position and the servomotor can burn out trying to do so. Both problems require complex recalibration of the valve, something that only a trained person can do.

OBJECTS OF THE INVENTION

It is therefore an object of the present invention to provide an improved method of operating a motor-controlled valve.

Another object is the provision of such an improved method of operating a motor-controlled valve which overcomes the above-given disadvantages, that is which accurately and easily determines when the valve is closed.

A further object is to provide a valve that can easily be reset.

SUMMARY OF THE INVENTION

According to the invention the closed position of a valve having a valve member that can be rotated by an electrical motor that in turn is connected to a potentiometer furnishing an output corresponding to valve position is determined by first energizing the motor so as to close the valve and monitoring the current consumption of the motor. The instantaneous current consumption of the motor is continuously or periodically compared with a set point corresponding to motor current consumption of the motor when stalled and the potentiometer output is recorded in a nonvolatile memory generally when the instantaneous motor current consumption exceeds the output so as to establish the corresponding position as the motor closed position. Then the motor is de-energized and from then on the recorded position is used as the full-closed valve position.

With this arrangement therefore the motor-control unit can be mounted on the valve and zeroed in a wholly automatic manner since the current consumption of the motor will rise dramatically when the motor stalls at its end position. There is no need for any particular skill on the part of the installer so that, even if the assembly needs to be taken apart subsequently, it is very easy to recalibrate it.

According to further features of this invention the potentiometer is set in an intermediate position from which it has an angular travel greater than the angular travel of the valve member, typically 345°, and thereafter the potentiometer and motor are connected to the valve member without substantially changing the potentiometer position. This ensures that the valve does not start in the closed position and that the potentiometer has sufficient travel for the full range of valve positions. One way to effect this is to manually turn both the valve and the motor control unit mainly to the fully open position and then connect them together. Alternately the potentiometer output corresponding to the intermediate position is permanently recorded and can in fact be preset in the EEPROM of the controller so that the motor can be moved to this position during assembly.

In accordance with further features of the invention before the above-described calibration steps the motor is briefly energized in a direction opening the valve. This also prevents the system from starting in the full-closed position.

The method may also include the steps of reversing energization of the motor when the motor current consumption exceeds the set point sufficiently to move the valve member in a direction opening the valve through a very small angle and thereafter recording the valve position as the motor closed position. This very small angle according to the invention is about 3°. It is also possible in this system to reverse energize the motor when the current consumption exceeds the set point in very small increments until the motor current consumption is less than the set point and to then record the valve position as the motor closed position. This method is useful since in fact most valves are physically closed before their elements reach an actual end position where they jam together

BRIEF DESCRIPTION OF THE DRAWING

The above and other objects, features, and advantages will become more readily apparent from the following, reference being made to the accompanying drawing whose sole FIGURE is a schematic drawing of a system for carrying out the instant invention.

SPECIFIC DESCRIPTION

As seen in the drawing a valve V has a valve-member shaft S that is connected to a motor M in turn associated with a potentiometer $P_0$ whose analog output is fed to an analog/digital converter W. The motor M itself is energized from a power source $S_0$ through a driver circuit D and the motor current is applied across a resistor $R_1$ across which is connected a threshold device K that compares the motor current with a predetermined and internally stored set point corresponding to the motor current when the motor M is stalled.

A counter Z has an output connected to a microprocessor P and an input connected to an AND gate 1 having one input connected to a calibrate switch T and another input connected to the output of the comparator K. The microprocessor P is connected to or incorporates a nonvolatile EEPROM memory E and the counter Z also receives the output from the potentiometer converter W. The microprocessor P in turn has an output connected to the counter Z and another output connected through a digital/analog converter C to the driver D. Another AND gate 3 has an output connected to the counter Z, one input connected to the calibrate switch T, and another input connected to the output of a further AND gate 2 one of whose inputs is connected to the comparator K and the other whose inputs is connected to a pulse generator I.

As described in above-cited German patent document 3,518,645 a PI controller 4 is connected to the driver D directly and through an analog-digital converter 5 and receives temperature and/or flow input from sensors 6 and 7 to control temperature and/or flow through the valve V. To this end the driver D has right-turn and left-turn inputs R and L.

To calibrate the system a stored intermediate position from the memory E is fed through the controller P and the converter C to the driver D to set the motor M in an intermediate position. Then the motor M is mounted on the shaft S of the valve V. The microprocessor P can then rotate the motor M slightly in a direction that opens the valve.

Subsequently the motor M is energized from the source S by the driver D to close the valve and the comparator K continuously compares the motor current to the set point. Meanwhile the person doing the valve calibrating is holding down the test button T. When the motor current exceeds the set point, indicating that the motor M is stalled and the valve is in its fully closed position, both inputs of the gate 1 are energized and it feeds a signal to the counter Z which then reads the instantaneous position of the motor M from the potentiometer $P_0$ and can record it through the microprocessor P in the nonvolatile memory E as the closed valve position.

In order to back the valve V off slightly from this fully closed position, since in reality flow through the valve is stopped before the parts actually mechanically jam in an end position, the counter Z, once it receives a signal from the and gate 1, has the motor M operate in reverse increments of 3° as determined by the pulse generator I until the output of the comparator stops, that is until the motor current is at a level indicating the valve is no longer mechanically fully in the end position. At this time the instantaneous position of the motor M and potientiometer V are recorded in the EEPROM memory E.

Thus all the user need do to calibrate the valve V is to push the button T. This can be done at any time, making recalibration of the valve that seems to be jamming or dripping very easy.

I claim:
1. A method of calibrating the closed position of a valve having a valve member that can be rotated by an electrical motor that in turn is connected to a potentiometer furnishing an output corresponding to valve position, the method comprising the steps of:
   a) energizing the motor so as to close the valve and monitoring the current consumption of the motor;
   b) comparing the instantaneous current consumption of the motor with a set point corresponding to motor current consumption of the motor when stalled;
   c) recording the potentiometer output generally when the instantaneous motor current consumption exceeds the output and establishing the corresponding position as the motor closed position in a nonvolatile memory; and
   d) thereafter de-energizing the motor using the recorded position as the full-closed valve position.
2. The method defined in claim 1, further comprising before step a) the steps of sequentially:
   a') setting the potentiometer in an intermediate position from which it has an angular travel greater than the angular travel of the valve member; and
   a'') thereafter connecting the potentiometer and motor to the valve member without substantially changing the potentiometer position.
3. The method defined in claim 1, further comprising the step of
   permanently recording the potentiometer output corresponding to the intermediate position.
4. The method defined in claim 1, further comprising before step a) the step of
   a') energizing the motor briefly in a direction opening the valve.
5. The method defined in claim 1 wherein step c) includes the substeps of:
   c') reversing energization of the motor when the motor current consumption exceeds the set point sufficiently to move the valve member in a direction opening the valve through a very small angle; and
   c'') thereafter recording the valve position as the motor closed position.
6. The method defined in claim 5 wherein the very small angle is about 3°.
7. The method defined in claim 1 wherein step c) includes the substeps of:
   c') reversing energization of the motor when the motor current consumption exceeds the set point sufficiently to move the valve member in a direction opening the valve through a very small angle;
   c'') thereafter reverse energizing the motor in very small increments until the motor current consumption is less than the set point; and
   c''') then recording the valve position as the motor closed position.

* * * * *